United States Patent [19]

Hahn et al.

[11] 4,293,656

[45] Oct. 6, 1981

[54] FLAME RETARDANT POLYSTYRENE

[75] Inventors: Klaus Hahn, Lampertheim; Herbert Naarmann, Wattenheim; Klaus Penzien, Frankenthal, all of Fed. Rep. of Germany

[73] Assignee: BASF Aktiengesellschaft, Ludwigshafen, Fed. Rep. of Germany

[21] Appl. No.: 211,378

[22] Filed: Nov. 28, 1980

[30] Foreign Application Priority Data

Dec. 13, 1979 [DE] Fed. Rep. of Germany ....... 2950098

[51] Int. Cl.³ ........................... C08J 9/18; C08K 5/06

[52] U.S. Cl. ............................. 521/88; 260/45.95 G; 260/DIG. 24; 521/98; 521/907

[58] Field of Search ................ 260/45.95 G, DIG. 24; 521/88, 907, 98

[56] References Cited

U.S. PATENT DOCUMENTS 3,639,302  2/1972  Brown et al. ...................... 521/907

*Primary Examiner*—Morton Foelak
*Attorney, Agent, or Firm*—H. Lawrence Jones; Joseph D. Michaels

[57] ABSTRACT

2,2-Bis(4-allyloxy-3,5-dibromophenyl)-propane is used as a flame-retardant synergist for polystyrene.

3 Claims, No Drawings

/* 4,293,656 */

FLAME RETARDANT POLYSTYRENE

BACKGROUND OF THE INVENTION

1. Field of the Invention

The present invention relates to a thermoplastic molding material comprising polystyrene containing a halogen-containing flame retardant, optionally a blowing agent, and 2,2-bis(4-allyloxy-3,5-dibromophenyl)-propane, which is a synergist, present in an amount of from 0.01 weight percent to 1.0 weight percent based on the weight of the polystyrene.

2. Description of the Prior Art

Halogen-containing organic compounds are effective flame retardants for polystyrene. However, the relatively large quantities of halogen compounds which must be added to the polymers in order to achieve sufficient flame retardation have a negative influence on many physical properties of the polymers.

The flame retarding effect of halogen compounds can be increased by additives having synergistic effects, which considerably reduce the amount needed for the flame retarding effect. Known and commonly used synergists include organic peroxides such as dicumyl peroxide. These synergists are toxic and at times decompose in an explosive manner. The handling and storage of these substances therefore requires expensive safety measures. Furthermore, even at room temperature peroxides slowly decompose so that the effectiveness of the flame retardation of peroxide containing polystyrene can decrease when they are stored for a long period of time. The decomposition of the peroxides increases with rising temperature. Peroxide synergists, therefore, cannot be used for the flame retardation of polystyrene which is processed at relatively high temperatures. For the foam extrusion of polystyrene, which is carried out at temperatures around 200° C., peroxide synergists cannot be used.

Other familiar synergists such as organic compounds having instable C—C— or N—N-bonds decompose during prolonged storage or when exposed to increased temperatures.

The synergist of this invention is a known compound. In the literature, it is referred to as "tetrabromodiallylether" or as "diallylether of tetrabromobisphenol A". British Pat. No. 1,206,171 and German Published application No. 2,226,694 describe the use of this bromine compound as flame retardant for plastics, for instance, also for polystyrene. However, these patents do not recommend the use of 2,2-bis-(4-allyloxy-3,5-dibromophenyl)-propane together with other halogen compounds and a possible synergistic effect is not mentioned at all.

An object of this invention was to develop a flame-retardant synergist for polystyrene containing a halogen-containing flame retardant and optionally a blowing agent which does not have the drawbacks of known peroxide synergists, and which, in particular, is stable when exposed to elevated temperatures.

SUMMARY OF THE INVENTION

A thermoplastic molding material is made from polystyrene containing a halogen-containing flame retardant, optionally a blowing agent and 2,2-bis(4-allyloxy-3,5-dibromophenyl)-propane, which is a synergist, present in the molding material in an amount of from 0.01 weight percent to 1.0 weight percent based on the weight of the polystyrene.

DESCRIPTION OF THE PREFERRED EMBODIMENTS

According to the invention, 2,2-bis-(4-allyloxy-3,5-dibromophenyl)-propane is used in quantities of 0.01 percent by weight to 1.0 percent by weight, relative to the polystyrene, as flame retardant synergist.

The synergist of this invention may be handled and stored without any danger and without specific precautionary measures. Its effectiveness is excellent and exceeds, for instance, the commonly used dicumyl peroxide. Polystyrene which is made flame retardant in accordance with this invention, does not lose its flame retardant properties even after prolonged storage. Finally, such polystyrene may also be processed by thermoplastic methods at elevated temperatures, for instance, by extrusion at temperatures around 150° C. to 200° C.

Polystyrene, in the sense of this invention, is styrene polymers and mixed polymers of styrene which contain at least 50 percent by weight of styrene in polymerized form. Illustrative comonomers include: $\alpha$-methylstyrene, acrylonitrile, methacrylonitrile, esters of acrylic and methacrylic acid, butadiene, and small quantities of divinylbenzene. The molding materials may also contain elastifying polymer additives such as rubber-like polymers of butadiene, ethylene or acrylic esters.

Examples of halogen-containing flame retardants are organic bromine and chlorine compounds, preferably containing at least 50 percent by weight of bromine or chlorine. A suitable compound is chloroparaffin. Examples of the preferred bromine compounds include: 1,2,5,6,9,10-hexabromocyclododecane, tetrabromodibenzalacetone, pentabromophenylallylether, pentabromomonochlorocyclohexane, 1,1,2,3,4,4-hexabromobutene-2, 2,5-bis-(tribromomethyl)-1,3,4-thiadiazol, 2,4,6-tris-(tribromomethyl)-1,3,5-triazine, tetrabromoethane, bromotrichloromethane, 1,2,5,6-tetrabromohexane, hexabromobenzene, pentabromophenol, pentabromodiphenylether, tris-(dibromopropyl)-phosphate, octabromocyclohexadecane, $\alpha$-bromonaphthalene.

The molding materials generally contain 0.1 percent by weight to 5 percent by weight of the halogen-containing flame retarding agent with the amount to be added being a function of the effectiveness of the agent. The preferred halogen compounds are used in the following quantities:

| | |
|---|---|
| Hexabromocyclododecane: | 0.4 percent by weight to 1.5 percent by weight |
| Hexabromobutene: | 0.2 percent by weight to 1.0 percent by weight |
| Tetrabromodibenzalacetone: | 0.2 percent by weight to 1.0 percent by weight |
| Pentabromophenylallylether: | 0.4 percent by weight to 2.0 percent by weight |
| Chloroparaffin: | 1.0 percent by weight to 4.0 percent by weight. |

The molding materials contain the synergist of this invention in an amount between 0.01 percent by weight and 1.0 percent by weight with the weight ratio of flame retardant to synergist preferably being between 50:1 and 2:1, more preferably between 20:1 and 4:1.

The thermoplastic molding materials of this invention may be processed into self-extinguishing molded parts by commonly used methods such as extrusion or injection molding.

This invention is of particular importance for expandable polystyrene which contains a blowing agent. For the purposes of this invention, polystyrene beads are produced by a method such as suspension polymerization, polystyrene granules are produced by a method such as extrusion, and polystyrene particles are made by partial expansion of beads or granules. The polystyrene generally contains 2 to 10 percent by weight of a liquid or gaseous organic compound which does not dissolve the polymer and the boiling point of which is below the softening point of the polymer. The blowing agents which may be used include aliphatic or cycloaliphatic hydrocarbons and chlorinated hydrocarbons such as butane, pentane, hexane, heptane, cyclohexane, methylchloride and dichlorodifluoromethane. Also suited are blowing agents which decompose at increased temperatures forming gases such as azodicarbonamide or sodium bicarbonate.

Polystyrene may be produced by polymerization in aqueous suspension in the presence of the blowing agent, the flame retardant and the synergist. Polystyrene beads thus made have a diameter of approximately 0.5 millimeter to 5 millimeters. Polystyrene beads also may be made by polymerization in aqueous suspension in the presence of the blowing agent and the synergist and subsequently coated with the flame retardant.

Polystyrene beads or granules may also be impregnated with the blowing agent after the production of the polystyrene alone, or with the flame retardant and the synergist. This is done, for instance, by treating the product in aqueous suspension.

The polystyrene may also be dissolved in a solvent; the blowing agent, the flame retardant, and synergist added, and the solvent evaporated.

The blowing agent, flame retardant and synergist may be added to the polystyrene in the molten state, extruding the polystyrene under such conditions that it does not foam, and cutting the extruded strands.

All of these methods result in polystyrene beads or granules which expand into foam particles upon being heated above the boiling point of the blowing agent and which may be made into molded foam parts using familiar methods. Basically, foams may also be produced directly by extruding polystyrene to which blowing agent, flame retardant and synergist have been added in the molten state, if the molten material is extruded directly into the atmosphere so that the expansion can take place directly at the extruder nozzle. In addition to flame retardant and synergist and blowing agent, the polystyrene may also contain commonly used additives such as fillers, pigments, lubricating agents, antistatic agents, antioxidants, stabilizers, agents promoting the formation of foam, as well as agents for preventing adhesions and agents for cutting the demolding time.

The following examples will further illustrate the various aspects of the invention. Where not otherwise specified throught this specification and claims, temperatures are in degrees centigrade and parts, percentages and proportions are by weight.

EXAMPLE 1

Foam Foil Tests

Thirty parts polystyrene are dissolved in 100 parts of methylene chloride. Three parts of pentane, various flame retardants and synergists listed in Table 1 are added to the solution. Following this, the solution is poured onto a glass plate and the methylene chloride is allowed to evaporate. The resultant foil is foamed in steam of 100° C. and dried in a vacuum. Test samples having dimensions of 0.5 centimeter × 15 centimeters × 40 centimeters are cut from the foam foil and are held into a gas flame with a height of 40 millimeters for 5 seconds and the flame is subsequently removed with a smooth movement. The "flame out" time of the test sample is a measure of its flame resistance and thus for the effectiveness of the flame retardant system. The extinguishing times listed in Table I are average values for 10 burning tests.

TABLE 1

| Test | Flame Retardant [%] | | Synergist [%] | | Extinguishing Times in Sec. |
|---|---|---|---|---|---|
| 1 | 0.8 | Hexabromocyclododecane | — | | 11 |
| 2 | 0.8 | 2,2-bis(4-allyl-oxy-3,5-dibromo-phenyl)-propane | — | | 10 |
| 3 | 0.8 | Hexabromocyclododecane | 0.2 | Dicumylperoxide | 3 |
| 4 | 0.8 | Hexabromocyclododecane | 0.2 | 2,2-bis(4-allyl-oxy-3,5-dibromo-phenyl)-propane | 1 |
| 5 | 0.8 | Hexabromocyclododecane | 0.1 | 2,2-bis(4-allyl-oxy-3,5-dibromo-phenyl)-propane | 1.5 |
| 6 | 0.8 | Hexabromocyclododecane | 0.05 | 2,2-bis(4-allyl-oxy-3,5-dibromo-phenyl)-propane | 4 |

Tests 4, 5 and 6 are in accordance with this invention.

EXAMPLE 2

Polymerization Tests

A mixture of 150 parts water, 0.1 part sodium pyrophosphate, 100 parts styrene, 7 parts n-pentane, 0.45 part benzoylperoxide and 0.15 part tertiary-butylperbenzoate (as polymerization initiators) as well as the parts of various flame retardants and synergists listed in Table 2, were heated to 90° C. while being stirred in a pressureresistant mixing vessel of stainless steel. After two hours at 90° C., 4 parts of a 10 percent aqueous solution of polyvinylpyrrolidone was added. Following this, the mixture was stirred for another two hours at 90° C., for two hours at 100° C., and finally for two hours at 120° C. The resultant polystyrene beads, having an average particle diameter of 1.5 millimeters, were isolated and dried.

By means of processing in a paddle mixer for three minutes, 100 parts of the expandable polystyrene beads were coated with 0.4 parts of glycerine monostearate.

The expandable coated polystyrene beads were foamed by utilizing steam and, after being stored for one day, the expanded foam was welded into foam blocks in a closed mold by further treatment with steam.

Using a heated wire, strips having dimensions of 2 centimeters × 20 centimeters × 40 centimeters were cut from the foam blocks. The after-burning period was measured using strips which were tilted at a 45 degree angle and which were ignited at the lower end with a natural gas flame. The time required for the flame to be extinguished was measured and the average value was determined from 20 individual measurements. The B2- burning test was carried out in accordance with DIN 4102. The results have been complied in Table 2.

TABLE 2

| Test | Flame Retardant [%] | | Synergist [%] | | Extinguishing Times in Sec. | B2-Test (DIN 4102) |
|---|---|---|---|---|---|---|
| | Polymerization Tests | | | | | |
| 1 | 0.64 | Hexabromocyclo-dodecane | — | | 13 | not passed |
| 2 | 0.64 | 2,2-bis(4-allyl-oxy-3,5-bromo-phenyl)-propane | — | | 11 | not passed |
| 3 | 0.64 | Hexabromocyclo-dodecane | 0.2 | Dicumylperoxide | 1 | passed |
| 4 | 0.64 | Hexabromocyclo-dodecane | 0.2 | 2,2-bis(4-allyloxy-3,5-dibromophenyl)-propane | 1 | passed |
| 5 | 0.64 | Hexabromocyclo-dodecane | 0.1 | 2,2-bis(4-allyloxy-3,5-dibromophenyl)-propane | 2 | passed |

Tests 4 and 5 are in accordance with the invention.

EXAMPLE 3

Extrusion Tests

Polystyrene was melted in a heated double-screw extruder with 6.5 percent of a mixture of 80 percent n-pentane and 20 percent iso-pentane, and various quantities of flame retardants and synergists listed in Table 3. The mass temperature in the extruder was 160° C. to 170° C. The homogenized mixture was extruded through a perforated plate with a nozzle cross section of 4.5 millimeters into a water bath of 20° C. and after a residence time of 12 seconds, was introduced into a granulating device equipped with a pair of discharge rollers. A knife cutter cut the strand into cylindrical granules.

Under steam, the granules were foamed into particles having a bulk density of 9 grams per liter.

In order to test the burning behavior, the foam particles, which were stored for five days, were filled into a cube having a one liter volume and produced from a wire mesh. The mesh size was five millimeters. In order to measure the after-burning time, the foamed material was ignited 30 millimeters from the upper edge of the cube using a 25 millimeter high gas flame which was tilted at a 45 degree angle and the flame was subsequently removed. The extinguishing time was measured and the average value was determined from 20 individual measurements.

The results are summarized in Table 3.

TABLE 3

| Test | Flame Retardant [%] | | Synergist [%] | | Extinguishing Times in Sec. |
|---|---|---|---|---|---|
| | Extrusion Tests | | | | |
| 1 | 3 | Hexabromocyclo-dodecane | — | | 3 |
| 2 | 3 | 2,2-bis(4-allyl-oxy-3,5-dibromo-phenyl)-propane | — | | 4.5 |
| 3 | 1.5 | Hexabromocyclo-dodecane | — | | 12 |
| 4 | 1.5 | 2,2-bis(4-alkyl-oxy-3,5-dibromo-phenyl)-propane | — | | 12 |
| 5 | 1.5 | Hexabromocyclo-dodecane | 0.2 | Dicumylperoxide | 9 |
| 6 | 1.5 | Hexabromocyclo-dodecane | 0.2 | 2,2-bis(4-allyloxy-3,5-dibromo-pheny)-propane | 2 |
| 7 | 1.5 | Hexabromocyclo-dodecane | 0.1 | 2,2-bis(4-allyloxy-3,5-dibromo-phenyl)-propane | 4 |

Tests 6 and 7 are in accordance with this invention.

The embodiments of the invention in which an exclusive privilege or property is claimed are defined as follows:

1. A thermoplastic molding material comprising polystyrene containing a halogen-containing organic flame retardant other than 2,2-bis(4allyloxy-3,5-dibromophenyl)-propane and 2,2-bis(4-allyloxy-3,5-dibromophenyl)-propane, which is a synergist, present in the molding material in an amount between 0.01 percent by weight and 1.0 percent by weight based on the weight of the polystyrene.

2. The thermoplastic molding material of claim 1 prepared in the presence of a blowing agent.

3. The thermoplastic molding material of claim 1 wherein the halogen-containing flame retardant is hexabromocyclododecane.

* * * * *